United States Patent
Zavarehi et al.

(10) Patent No.: US 7,614,753 B2
(45) Date of Patent: Nov. 10, 2009

(54) DETERMINING AN ADJUSTMENT

(75) Inventors: Masoud Zavarehi, Corvallis, OR (US); Grant K. Garner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 11/263,813

(22) Filed: Oct. 31, 2005

(65) Prior Publication Data

US 2007/0097333 A1    May 3, 2007

(51) Int. Cl.
G03B 21/20    (2006.01)
G03B 21/60    (2006.01)

(52) U.S. Cl. ........................................ 353/85

(58) Field of Classification Search .................. 353/43, 353/85, 122; 359/459; 348/602
See application file for complete search history.

(56) References Cited

U.S. PATENT DOCUMENTS

| | | | |
|---|---|---|---|
| 4,997,271 A | 3/1991 | Shanks | |
| 5,022,750 A | 6/1991 | Flasck | |
| 5,108,172 A | 4/1992 | Flasck | |
| 5,335,022 A | 8/1994 | Braun et al. | |
| 6,520,645 B2 | 2/2003 | Yamamoto et al. | |
| 6,538,814 B2 | 3/2003 | Hunter et al. | |
| 6,597,501 B2 | 7/2003 | Lambert et al. | |
| 6,631,995 B2 | 10/2003 | Stanton et al. | |
| 6,634,757 B2 | 10/2003 | Asakawa | |
| 6,674,060 B2 * | 1/2004 | Antila | 250/205 |
| 6,769,774 B2 | 8/2004 | McDowell | |
| 6,814,443 B2 | 11/2004 | Safran et al. | |
| 6,853,486 B2 | 2/2005 | Cruz-Uribe | |
| 6,857,747 B2 | 2/2005 | Pentico et al. | |
| 2006/0088275 A1 * | 4/2006 | O'Dea et al. | 386/46 |
| 2007/0081102 A1 * | 4/2007 | Ramanath et al. | 348/602 |
| 2007/0091433 A1 * | 4/2007 | Garner et al. | 359/459 |
| 2007/0091435 A1 * | 4/2007 | Garner et al. | 359/459 |

* cited by examiner

*Primary Examiner*—Hung Henry Nguyen

(57) ABSTRACT

A method of compensating in a projection system includes measuring a characteristic of ambient light incident on a screen; determining a gradient of the characteristic; and determining an adjustment to be applied to light to be projected using the gradient.

29 Claims, 6 Drawing Sheets

US 7,614,753 B2

DETERMINING AN ADJUSTMENT

BACKGROUND

Traditionally, projection systems have been useful in dark viewing environments, such as in darkened theaters, while being less usefully in environments including more ambient light. There is a desire to broaden the market for projection systems beyond a darkened theater environment, such as a home environment. However, a non-darkened environment such as a home environment typically includes the presence of ambient light, particularly during daytime hours. Unfortunately, ambient light increases the difficulty for the viewer in seeing the details of the image in its full fidelity, as ambient light degrades contrast and the perceived brightness of the image.

DETAILED DESCRIPTION

Figure 1:
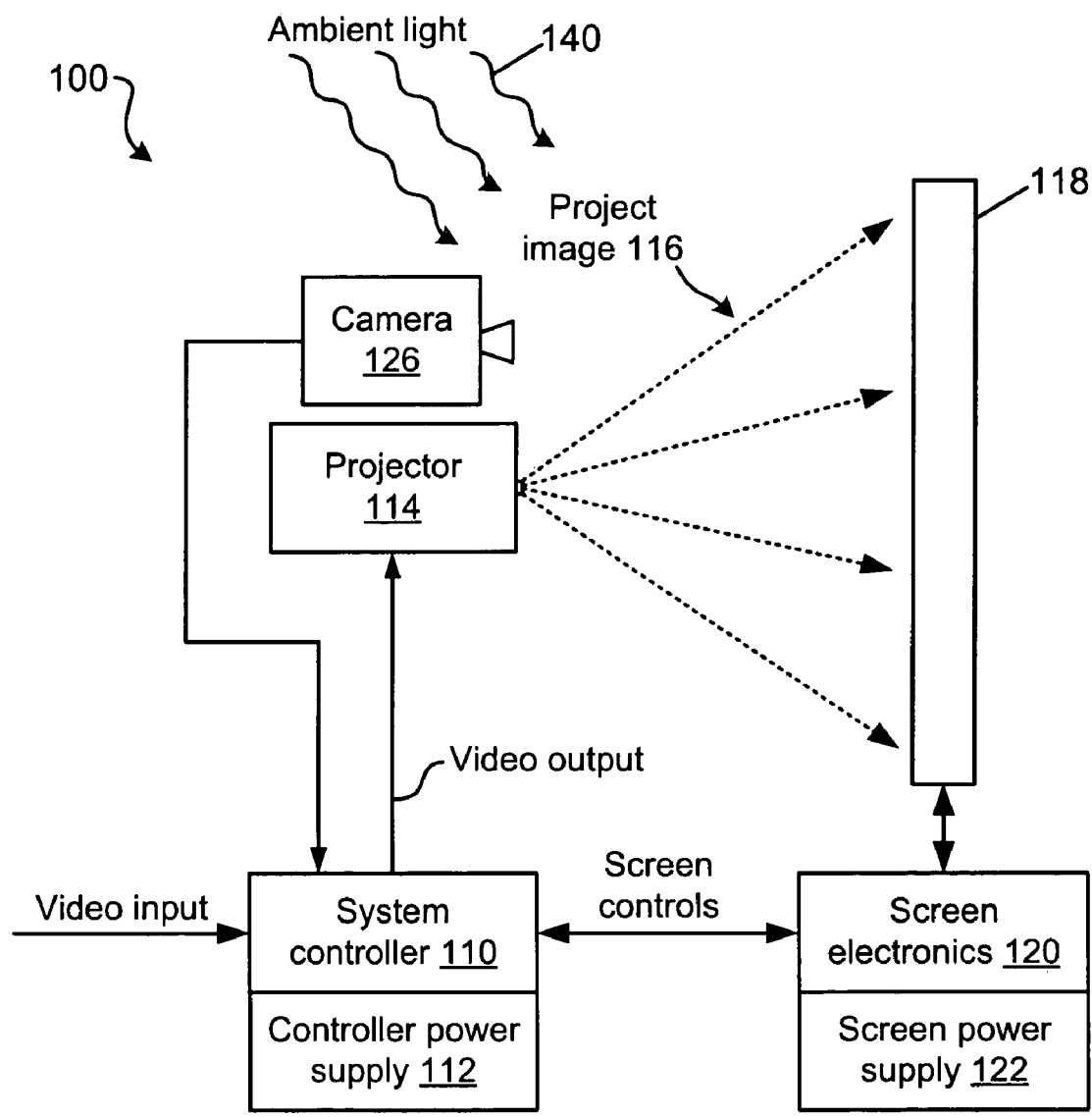
FIG. 1 illustrates a functional block diagram of an exemplary embodiment of a projection system for compensating for the presence of non-uniform ambient and projected light.

In the following detailed description and in the several figures of the drawing, like elements are identified with like reference numerals. The figures are not to scale, and relative feature sizes may be exaggerated for illustrative purposes.

FIG. 1 illustrates a functional block diagram of an exemplary embodiment of a projection system 100 that is suitable for compensating for the presence of non-uniform ambient and projected light. Compensating refers to reducing the magnitude of the undesirable effects on image quality resulting from these non-uniformities. The projection system 100 includes a system controller 110 that has an associated controller power supply 112, a projector 114 that produces a projected image 116, an embodiment of a screen, such as an active projection screen 118 that has an associated screen electronics 120, and a screen power supply 122. Alternatively, the screen may be a passive projection screen, i.e. a projection screen whose reflectivity is not actively controlled or modulated. The projection system 100 further includes one or more photodetectors 124 that are built into the active projection screen 118 and may include, in some embodiments, a camera 126 that is directed toward the active projection screen 118.

Figure 1A:
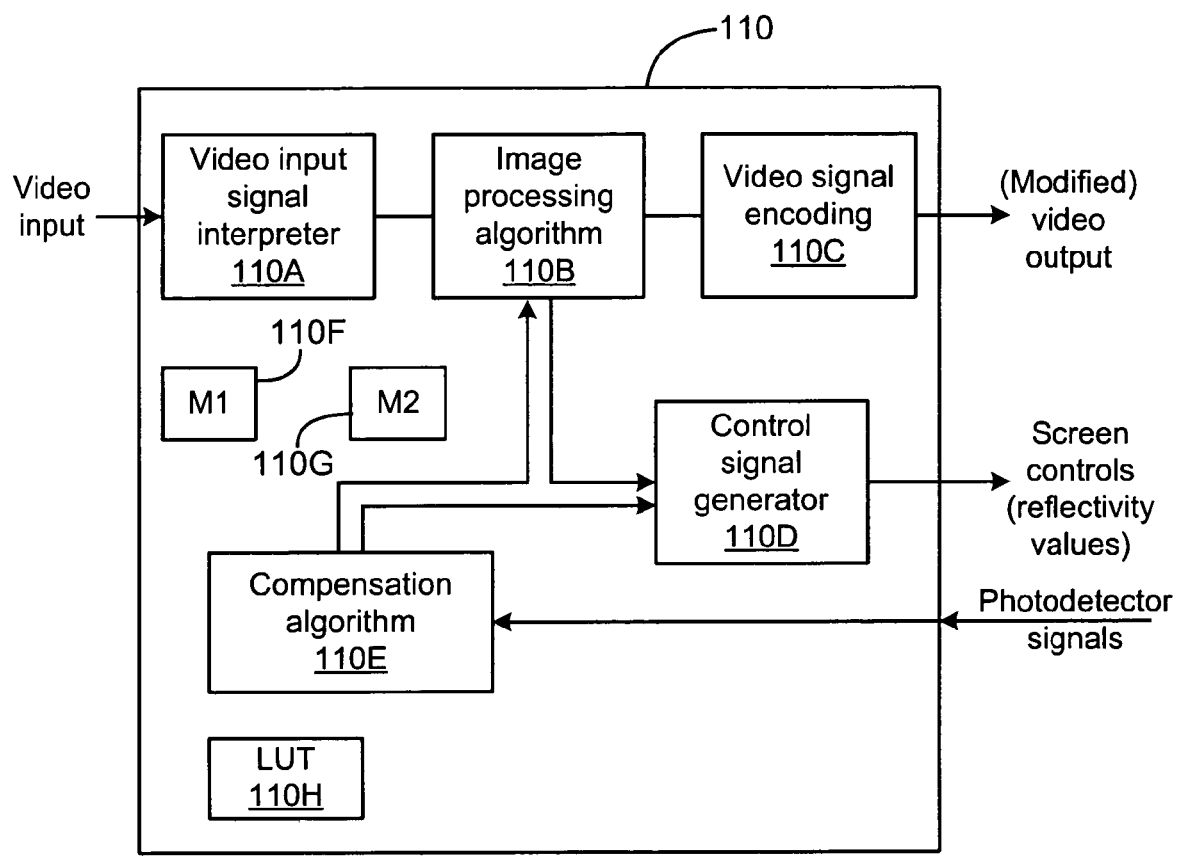
FIG. 1A is a simplified schematic block diagram of an exemplary embodiment of a system controller for the embodiment of the projector system of FIG. 1

Referring now to FIG. 1A, in this exemplary embodiment, the system controller 110 may serve as the overall controller of the screen projection system 100. An input to the system controller 110 is a video input signal from a video output device, such as a DVD player or computer. A first output of system controller 110 is a video output signal feeding a video input of projector 114. A second output of system controller 110 is a set of electronic control signals feeding an input of screen electronics 120, if an active projection screen is used instead of a passive projection screen. System controller 110 may include a video input signal interpreter 110A to interpret the video input signal, e.g. to convert input codes or voltage levels into a representation of the amount of light that should be observed. The system controller 110 may also include an image processing algorithm 110B implemented by software or firmware on a processor, and a video signal encoding electronics 110C to encode the output video signal to projector 114. The system controller 110 also includes, in an exemplary embodiment, a control signal generator 110D for generating the electronic control signals to screen electronics 120 of an active projection screen 118. A compensation algorithm 110E performs ambient light and projector light compensation, discussed further below. The controller includes memories 110F, 110G, 110H, which may, in an exemplary embodiment, store instructions or program code for implementing the algorithms 110B, 110E.

In the embodiment illustrated, controller 110 generally includes constitutes a processing unit configured to analyze input and to generate output to facilitate operation of projection system 100. For purposes of the disclosure, the term "processor unit" shall include a presently available or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 110 is not limited to any specific combination of hardware circuitry and software, nor to any particular source for the instructions executed by the processing unit.

"Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc. Computer readable media may also refer to signals that are used to propagate the computer executable instructions over a network or a network system such as the Internet. In the embodiment illustrated in FIG. 1A, memories 110F, 110G, 110H may be computer-readable media.

The system controller 110 executes image processing algorithm 110B that analyzes the video input, information from the compensation algorithm 110E, and then generates, using video signal encoding 110C, a modified video output signal to projector 114. If the projection screen is an active projection screen, the system controller 110 may also or alternatively provide a reflectivity value (via control signal generator 110D) to the active projection screen 118.

In an exemplary embodiment, system controller 110 processes a video data format at its input, such as component, composite, or RGB. The video processing by system controller 110 is transparent to projector 114, as projector 114 receives a video signal in the same format that is received by system controller 110.

Controller power supply 112 is a DC power supply device for providing electrical power to system controller 110. Controller power supply 112 provides an output voltage of, for example, 3 to 5 volts.

In one embodiment, projector 114 may be a commercially available projector, such as, by way of example, the Hewlett-Packard EP7120 projector. From the video output signal of system controller 110, projector 114 produces projected image 116 that is directed onto the active projection screen 118. Also incident on the screen is ambient light 140.

In an exemplary embodiment for the case of an active projection screen, the active projection screen 118 may be a single-pixel or multi-pixel variable reflectivity screen upon which projected image 116 is projected. In the case of a single-pixel active screen, the reflectivity of the entire area of active projection screen 118 capable of varying its reflectivity is varied uniformly. In the case of a multi-pixel active screen, the reflectivity of each pixel is individually controlled by system controller 110 via screen electronics 120.

Screen electronics 120 may be an electronic device that modulates the reflectivity of the active projection screen 118 based on the electronic control signals from system controller 110. This allows, in an exemplary embodiment, the system to electronically adjust the amount of light that is reflected by active projection screen 118 back to the viewer on a pixel by pixel basis. The screen electronics 120 may be omitted in the case of a passive projection screen embodiment.

Screen power supply 122 is a DC power supply device for providing electrical power to active projection screen 118 and screen electronics 120. Screen power supply 122 provides an output voltage of, for example, 40 to 100 volts. Alternatively, screen power supply 122 is not present within projection system 100 and instead controller power supply 112 supplies power to system controller 110, active projection screen 118, and screen electronics 120. A screen power supply may be omitted for the case of a passive projection screen embodiment.

Figure 2:
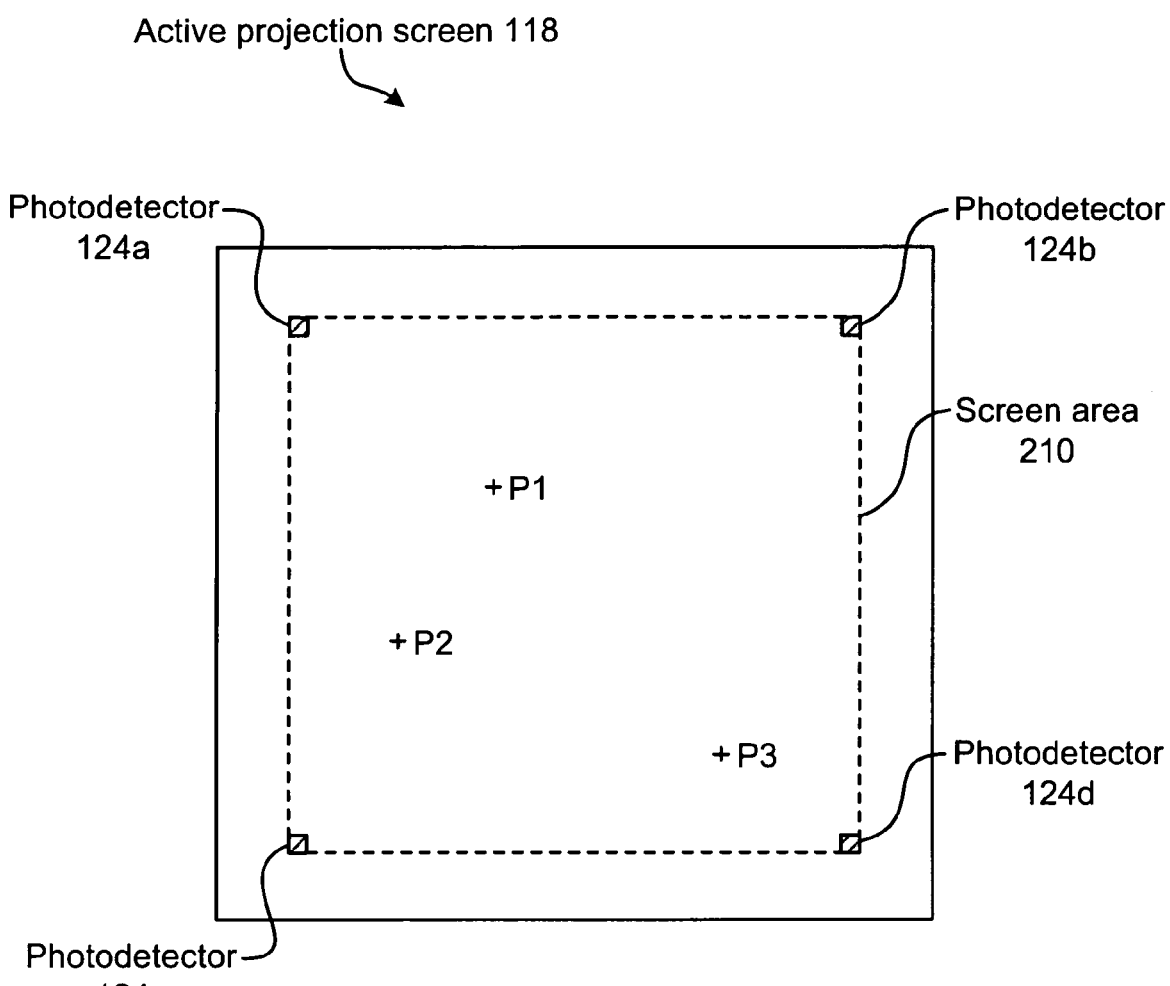
FIG. 2 illustrates a front view of an exemplary embodiment of a projection screen which may be employed in the system of FIG. 1.

Referring to FIG. 2, each photodetector 124 is capable of producing an electrical signal proportional to the intensity of incident light. Each photodetector 124 is capable of detecting luminance without detecting other attributes of light or, alternatively, is capable of detecting tristimulus values, X, Y, and Z, where X and Z are chrominance parameters and Y is luminance. Suitable photodetectors are commercially available. An exemplary photodetector suitable for the purpose is the photodetector available from Edmund Silicon as stock number Y57-506. The output signal of each photodetector 124 is transmitted to system controller 110 for use as a parameter in an algorithm 110E for compensating for the presence of non-uniform ambient and projected light.

Camera 126 may be, for example, a color web camera that has an infinite focus fixed lens. Camera 126 is electrically connected to system controller 110. Camera 126 captures the image of the active projection screen 118. System controller 110 then processes the image that is captured by camera 126 to extract the relevant features from that image.

FIG. 2 illustrates a front view of the active projection screen 118 of the projection system 100 onto which projected image 116 is projected. FIG. 2 shows, as an example, four photodetectors 124 (e.g., photodetectors 124a, 124b, 124c, and 124d) installed in precisely specified locations within the active projection screen 118. The number of photodetectors 124 installed in the active projection screen 118 may be varied according to the conditions of a particular application. However, in one exemplary embodiment, the number of photodetectors 124 installed in active projection screen 118 is at least 4. An exemplary embodiment of an active projection screen suitable for the purpose of active projection screen 118 is described in U.S. Pat. No. 6,853,486.

Whether a single-pixel screen or multi-pixel screen, each screen pixel of the exemplary active projection screen 118 has a controlled variable reflectivity (R). Each screen pixel is controllable between a lower reflectivity limit (RL) and an upper reflectivity limit (RH), expressed as a percentage of reflected light. In one example, RL is 20% and RH is 70%. The reflectivity value is set between RL and RH via screen electronics 120 according to the electronic control signals from system controller 110. An example mechanism for varying the screen reflectivity is PDLC (polymer dispersed liquid crystal) with an absorbing backing material; as the PDLC becomes transparent, more light is absorbed by the backing material, rather than being reflected by the PDLC.

FIG. 2 shows randomly selected points P1, P2, and P3 upon the active projection screen 118. Points P1, P2, and P3 are representative of any screen locations within a screen area 210 of the active projection screen 118. In this exemplary embodiment, screen area 210 is defined at its four corners by photodetectors 124a, 124b, 124c, and 124d, respectively.

The ambient light present in the viewing environment of screen projection system 100 may or may not be uniform across the entirety of screen area 210 of the active projection screen 118. Likewise, the projected light of projected image 116 from projector 114 may or may not be uniform across the entirety of screen area 210 of active projection screen 118. Consequently, a gradient of intensity of incident light across screen area 210 may occur. Methods of compensating for non-uniform ambient light and projected light intensity are described in more detail in reference to FIGS. 3-5.

Figure 3:
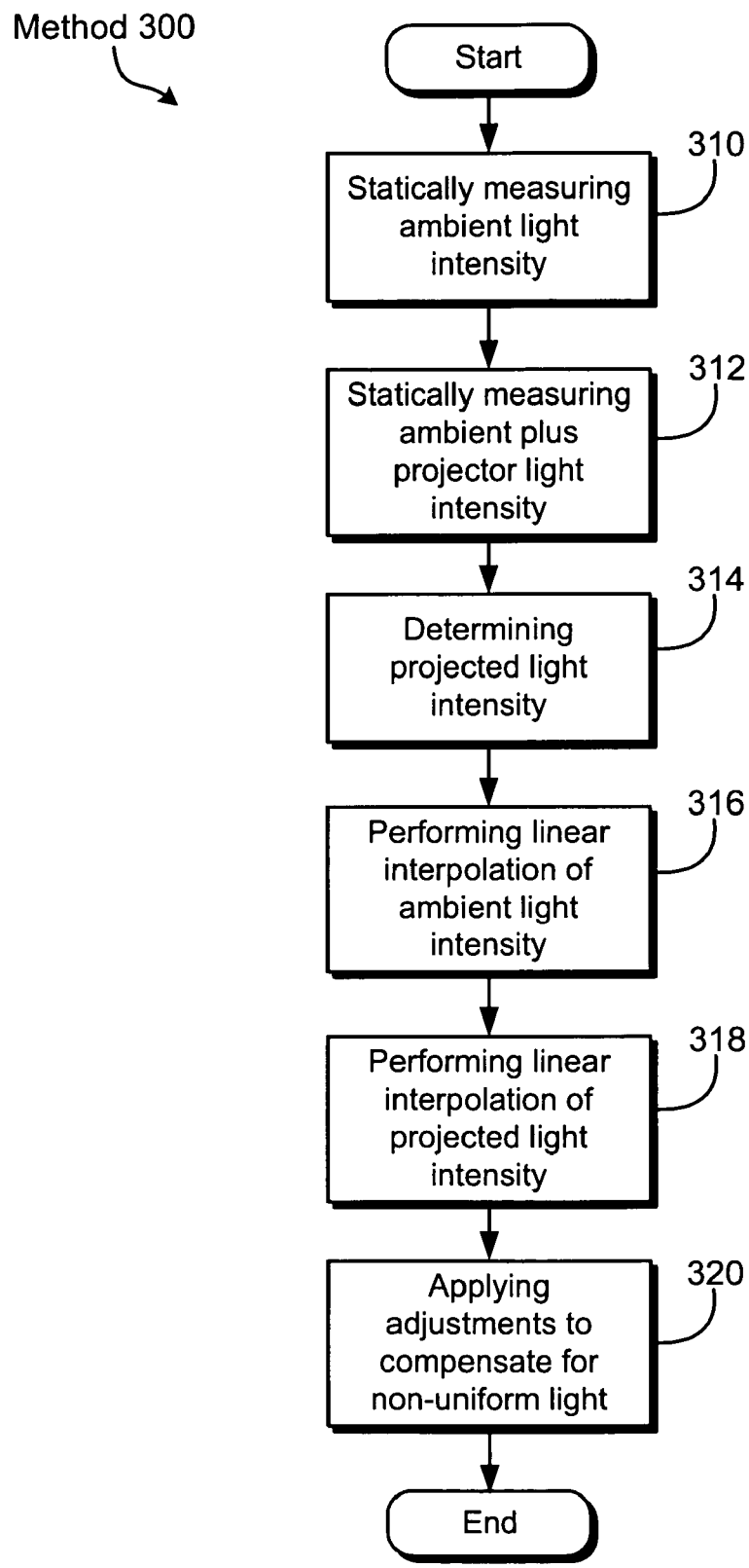
FIG. 3 illustrates a simplified flow diagram of an exemplary embodiment of a method of compensating for ambient light and projected light intensity that is non-uniform across the area of the projection screen.

FIG. 3 illustrates a flow diagram of an embodiment of a method 300 of compensating for ambient light and projected light intensity that is non-uniform across the area of the screen, such as, in an embodiment, active projection screen 118. Method 300 may performed by a compensation algorithm 110E executing within system controller 110 of screen projection system 100. Additionally, method 300 may be performed as a part of a setup operation of screen projection system 100.

At step 310, system controller 110 measures statically the ambient light intensity in the viewing environment. In the case of an active projection screen 118, this may be done by setting the reflectivity of all screen pixels of active projection screen 118 to a fixed reflectivity setting of, for example, the upper reflectivity limit (RH), setting projected image 116 to black, and receiving the light measurements from photodetectors 124a, 124b, 124c, and 124d. In the case of a passive projection screen 118, of course, the reflectivities of screen pixels are not adjusted during this step. Light intensity measurement values A1, A2, A3, and A4 from photodetectors 124a, 124b, 124c, and 124d, respectively, are stored in a first memory unit 110F (FIG. 1A) within system controller 110. In one embodiment, system controller 110 measures the color component of the ambient light and stores the tristimulus values in the sensor data along with the light measurements. Alternatively, system controller 110 captures the reflected image of the active projection screen 118 by use of camera 126.

At step 312, system controller 110 measures statically the ambient light plus the projected light intensity. In the case of an active projection screen 118, this may be accomplished by setting the reflectivity of all screen pixels 210 to a fixed reflectivity setting of, for example, the upper limit reflectivity (RH), setting projected image 116 to white, and receiving the light intensity measurements from photodetectors 124a, 124b, 124c, and 124d. In the case of a passive projection screen, of course, the reflectivity of screen pixels is not adjusted during this step. Light intensity measurement values B1, B2, B3, and B4 from photodetectors 124a, 124b, 124c, and 124d, respectively, are stored in a second memory unit 110G (FIG. 1A) within system controller 110. This will provide a measurement for the pixel intensity value space. In one embodiment, system controller 110 measures the color component of the ambient light plus the projected light and stores the tristimulus values in the sensor data along with the light measurements. Alternatively, system controller 110 captures the reflected image of active projection screen 118 by use of camera 126.

At step 314, the algorithm executing within system controller 110 determines the projected light intensity by calculating the difference between the light intensity measurement values A1, A2, A3, and A4 of step 310 and the light intensity measurement values B1, B2, B3, and B4, respectively, of step 312, again for the pixel value space, e.g. the intensity value. In doing so, a set of projected light intensity values C1, C2, C3, and C4, at the physical locations of photodetectors 124a, 124b, 124c, and 124d, respectively, are derived. Alternatively, system controller 110 analyzes the difference between the images captured by camera 126 in steps 310 and 312 to determine the projected light intensity.

At step 316, in an exemplary embodiment, the algorithm executing within system controller 110 performs a linear interpolation of the ambient light intensity as measured in step 310 and thereby determines an ambient light intensity gradient across screen area 210, which makes it possible to determine an estimate of the ambient light intensity at locations on screen area 210, such as at points P1, P2, and P3. Thus, this operation is performed for the pixel location space (x, y) of the screen area 210. Subsequently, system controller 110 may create a one- or two-dimensional look-up table (LUT) of ambient light intensity. If the sensor data includes the color components, system controller 110 may perform a color mapping process and creates a LUT of color adjustment accordingly.

At step 318, in an exemplary embodiment, the algorithm executing within system controller 110 performs a linear interpolation of the projected light intensity as derived in step 314 and thereby determines a projected light intensity gradient across screen area 210, which makes it possible to determine, such as by calculation, an estimate of the projected light intensity at locations on screen area 210, such as at points P1, P2, and P3. Thus, this operation is performed for the pixel location space (x, y). Subsequently, system controller 110 creates a one- or two-dimensional LUT of projected light intensity. If the sensor data includes the color components, system controller 110 performs a color mapping process and creates a LUT of color adjustment accordingly.

At step 320, the algorithm 110B executing within system controller 110 processes the image data to compensate for non-uniform ambient or projected light by applying the LUTs of steps 316 and 318 to the individual image pixels received from the video input signal interpreter 110A in order to compensate for the non-uniform ambient or projected light intensity for the projector pixel locations and the screen pixel locations. In one embodiment, the compensation is performed for every one of the projector pixel locations and every one of the screen pixel locations. For example, a compensation value in the LUT for points P1, P2, and P3 is applied to the individual image pixels received from the video input signal interpreter 110A associated with the logical and physical locations of points P1, P2, and P3. Alternatively, or additionally, the screen reflectivity of an active screen may be controlled, by signals from the control signal generator 110D. Method 300 Ends.

Figure 4:
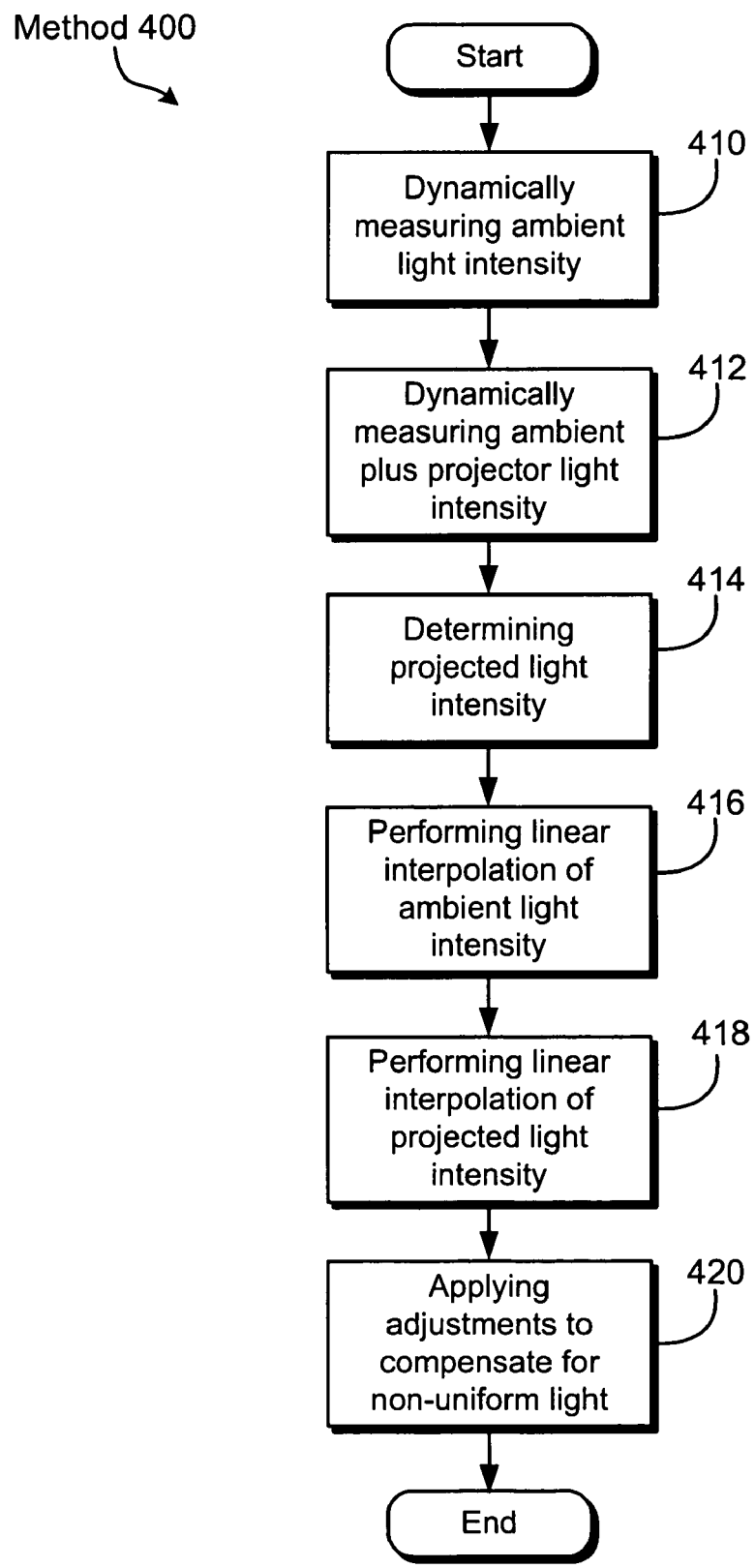
FIG. 4 illustrates a flow diagram of an exemplary embodiment of a method of compensating for ambient light and projected light intensity that varies over time.

FIG. 4 illustrates a flow diagram of an exemplary embodiment of a method 400 of compensating for ambient light and projected light intensity that varies over time in accordance with the an embodiment. Method 400 may be performed by an image processing algorithm executing within system controller 110 of active screen projection system 100. Method 400 may also be performed periodically during the operation of screen projection system 100.

At step 410, during a single frame of projected image 114, which is typically ⅟30th of a second in duration, system controller 110 measures the ambient light intensity in the viewing environment. More specifically, in the example of an active screen embodiment of a projection screen, such as active projection screen 118, in a predetermined frame of projected image 114, system controller 110 sets projected image 116 to black, sets the reflectivity of all screen pixels of active projection screen 118 to a fixed reflectivity setting of, for example, the upper limit of reflectively (RH), and receives the light intensity measurements from photodetectors 124a, 124b, 124c, and 124d. In the case of a passive projection screen, of course, the reflectivity of screen pixels is not adjusted during this step. Light measurement values A1, A2, A3, and A4 from photodetectors 124a, 124b, 124c, and 124d, respectively, are stored in a first memory unit 110F (FIG. 1A) within system controller 110. In one embodiment, system controller 110 measures the color component of the ambient light and stores the tristimulus values in the sensor data along with the light measurements. Alternatively, system controller 110 captures the reflected image of active projection screen 118 by use of camera 126.

At step 412, during a single frame of projected image 114, which is typically ⅟30th of a second in duration, system controller 110 measures the ambient light and projected light intensity in the viewing environment. More specifically, in the example of an active screen embodiment of a projection screen, such as active projection screen 118, in a predetermined frame of projected image 114, system controller 110 sets projected image 116 to white, sets the reflectivity of all screen pixels of active projection screen 118 to a fixed reflectivity setting of, for example, upper reflectively limit (RH), and receives the light intensity measurements from photodetectors 124a, 124b, 124c, and 124d. In the case of a passive projection screen, of course, the reflectivity of screen pixels is not adjusted during this step. Light measurement values B1, B2, B3, and B4 from photodetectors 124a, 124b, 124c, and 124d, respectively, are stored in a second memory unit 110G (FIG. 1A) within system controller 110. In one embodiment, system controller 110 measures the color component of the ambient light plus the projected light and stores the tristimulus values in the sensor data along with the light measurements. Alternatively, system controller 110 captures the reflected image of active projection screen 118 by use of camera 126.

At step 414, the algorithm executing within system controller 110 determines the projected light intensity by calculating the difference between the light intensity measurement values A1, A2, A3, and A4 of step 410 and the light intensity measurement values B1, B2, B3, and B4, respectively, of step 412. In doing so, a set of projected light intensity values C1, C2, C3, and C4, at the physical locations of photodetectors 124a, 124b, 124c, and 124d, respectively, are derived. Alternatively, system controller 110 analyzes the difference between the images captured by camera 126 in steps 410 and 412 to determine the projected light intensity. An algorithm similar to that described for step 314 may be used to implement this step, for example.

At step 416, the algorithm executing within system controller 110 performs a linear interpolation of the ambient light intensity as measured in step 410 and thereby determines an ambient light intensity gradient across screen area 210, which makes it possible to determine, such as by calculation, an estimate of the ambient light intensity at all locations on screen area 210, such as at points P1, P2, and P3. Subsequently, system controller 110 creates a one- or two-dimensional LUT of ambient light intensity. If the sensor data includes the color components, system controller 110 performs a color mapping process and creates a LUT of color adjustment accordingly. An algorithm similar to that described for step 316 may be used to implement this step, for example.

At step 418, the algorithm executing within system controller 110 performs a linear interpolation of the projected light intensity as derived in step 414 and thereby determines a projected light intensity gradient across screen area 210, which makes it possible to determine, such as by calculation, the projected light intensity at locations of screen area 210, such as at points P1, P2, and P3. Subsequently, system controller 110 creates a one- or two-dimensional LUT of projected light intensity. If the sensor data includes the color components, system controller 110 performs a color mapping process and creates a LUT of color adjustment accordingly. An algorithm similar to that described for step 318 may be used to implement this step, for example.

At step 420, the algorithm executing within system controller 110 processes the image data to compensate for non-uniform ambient or projected light by applying the LUTs of steps 416 and 418 to the individual image pixels received from the video input signal interpreter 110A in order to compensate for non-uniform ambient or projected light intensity for every projector pixel location and every screen pixel location. For example, a compensation value in the LUT for points P1, P2, and P3 is applied to the individual image pixels received from the video input signal interpreter 110A associated with the logical and physical locations of points P1, P2, and P3. Alternatively, or additionally, the screen reflectivity of an active screen may be controlled, by signals from the control signal generator 110D. An algorithm similar to that described for step 320 may be used to implement this step, for example.

In an exemplary embodiment, the screen projection system 100 and methods 300 and 400 may provide a mechanism for compensating for ambient light and projected light intensity that is non-uniform across the area of the viewing screen or non-uniform over time. The projection system 100 and methods 300 and 400 may provide a mechanism for determining a gradient of ambient and/or projector light intensity across the area of active projection screen 118 and for subsequently generating a LUT for applying a compensation to each image pixel location of projected image 116 and each pixel location of active projection screen 118.

Figure 5:
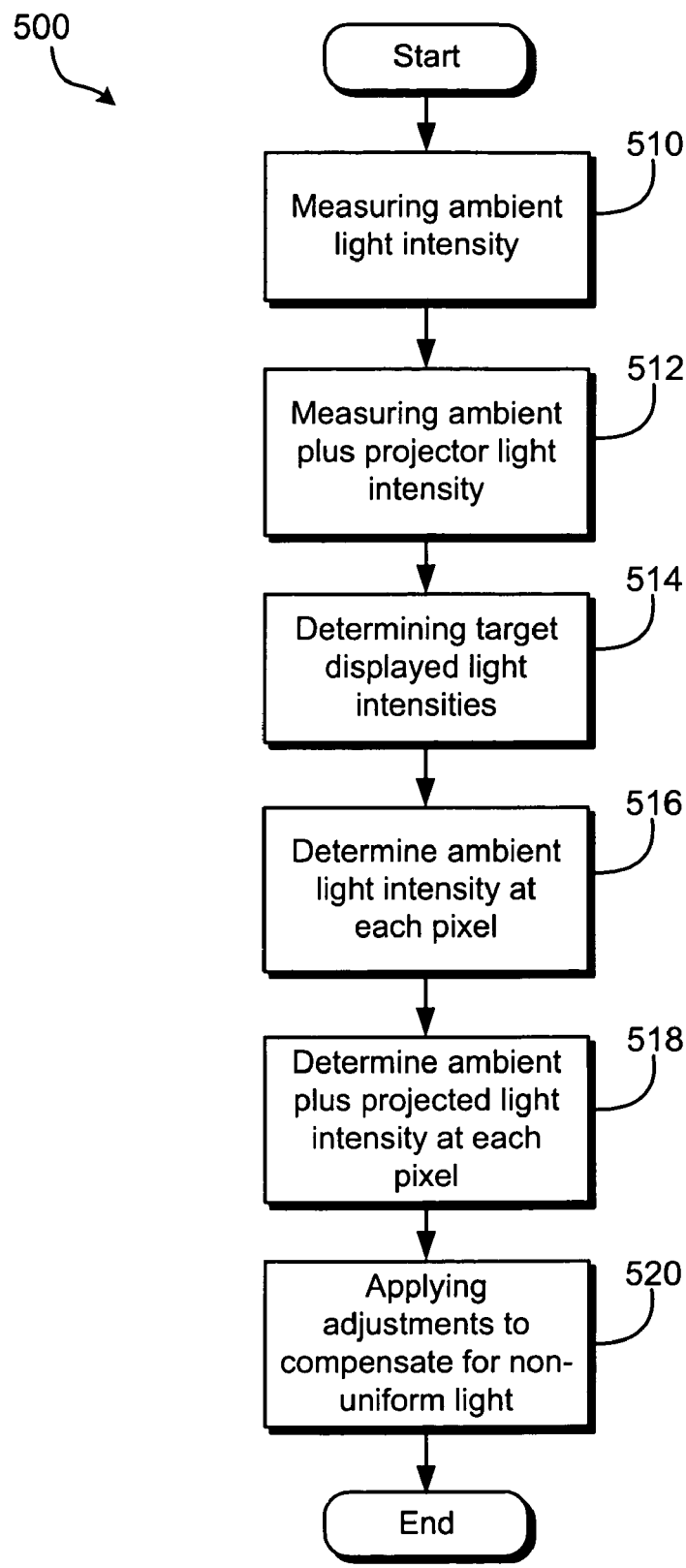
FIG. 5 is a schematic diagram of an exemplary method for determining an adjustment to correct for non-uniform light intensity.

FIG. 5 is a schematic diagram of an exemplary method 500 for determining an adjustment to compensate for non-uniform light intensity. Method 500 may performed by a compensation algorithm 110E executing within system controller 110 of screen projection system 100. Additionally, method 500 may be performed as a part of a setup operation of screen projection system 100.

At step 510, system controller 110 measures the ambient light intensity in the viewing environment. In one embodiment, the measurement is a static measurement as in 310 of the method 300; in another embodiment, the measurement may be a dynamic measurement as in 410 of the method 400. In the case of an active projection screen 118, the measurement 510 may be done by setting the reflectivity of all screen pixels of active projection screen 118 to a fixed reflectivity setting of, for example, the upper reflectivity limit (RH), setting projected image 116 to black, and receiving the light measurements from photodetectors 124a, 124b, 124c, and 124d. In the case of a passive projection screen 118, of course, the reflectivities of screen pixels are not adjusted during this step. Luminance intensity measurement values $Y_{Aa,b,c,d}$ at each respective sensor 124a, 124b, 124c, and 124d, respectively, are stored in a first memory unit 110F (FIG. 1A) within system controller 110. The maximum value $(Y_A)_{max}$ of the measured luminance intensity values may also be found and stored in memory. In one embodiment, system controller 110 measures the color component of the ambient light and stores the tristimulus values in the sensor data along with the light measurements. Alternatively, system controller 110 may capture the reflected image of the active projection screen 118 by use of camera 126.

At step 512, system controller 110 measures the ambient light plus the projected light intensity. In one embodiment, the measurement is a static measurement as in 310 of the method 300; in another embodiment, the measurement may be a dynamic measurement as in 410 of the method 400. In the case of an active projection screen 118, the measurement may be accomplished by setting the reflectivity of all screen pixels 210 to a fixed reflectivity setting of, for example, the upper limit reflectively (RH), setting projected image 116 to white, and receiving the light intensity measurements from photodetectors 124a, 124b, 124c, and 124d. In the case of a passive projection screen, of course, the reflectivity of screen pixels is not adjusted during this step. Luminance intensity measurement values $Y_{Ba,b,c,d}$ from sensors 124a, 124b, 124c, and 124d, respectively, are stored in a second memory unit 110G (FIG. 1A) within system controller 110. In one embodiment, the minimum $Y_B$ on the screen $(Y_B)_{min}$ may be found and stored in memory. These measurements will provide a measurement for the pixel intensity value space. In one embodiment, system controller 110 measures the color component of the ambient light plus the projected light and stores the tristimulus values in the sensor data along with the light measurements. Alternatively, system controller 110 captures the reflected image of active projection screen 118 by use of camera 126.

At 514, the target displayed light intensities are determined; that is, the input video values are rescaled to lie in the range of attainable screen illuminances. An exemplary embodiment of an algorithm for determining, such as, for example, by computation, the target displayed light intensity $(Y_B)_T$ corresponding to an input domain of values $Y_T$ in step 514 includes the following: $(Y_B)_T=[(Y_B)_{min}-(Y_A)_{max}]*Y_T+(Y_A)_{max}$ At 516, the ambient light intensity is determined at each pixel. These intensity values $Y_{Ap}$ may be determined, in an exemplary embodiment, by bilinear interpolation of the pixel's position relative to the sensor positions and the measured values $Y_{Aa,b,c,d}$.

At 518, the intensity of the ambient light plus the projector light is determined. These intensity values $Y_{Bp}$ may be determined, in an exemplary embodiment, by bilinear interolation of the pixel's position relative to the sensor positions and the measured values of $Y_{Ba,b,c,d}$.

At 520, adjustments are applied to compensate for non-uniform light. In an exemplary embodiment, the adjustments may be determined, e.g., by the following calculation. For each image pixel ($P_{IJ}$), compute a corrected pixel intensity value: $(Y_P)_C=[(Y_B)_T-Y_{Ap}]/[Y_{Bp}-Y_{Ap}]$ An exemplary algorithm for determining adjustments for the image chromaticity values (if a color sensor is used) for step 520 is the following:

Inputs: Projector Image RGB Values.

Compute the projector image tri-stimulus values $X_P$, $Y_P$, $Z_P$ from RGB. For example, by assuming the RGB image is an sRGB image, 3×3 transformations can be used:

$$\begin{bmatrix} X_P \\ Y_P \\ Z_P \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \times \begin{bmatrix} R \\ G \\ B \end{bmatrix}^{2.4}$$

For each image pixel ($P_{IJ}$), compute the pixel chromaticity values:

$x=X_P/(X_P+Y_P+Z_P), y=Y_P/(X_P+Y_P+Z_P), z=Z_P/(X_P+Y_P+Z_P)$

An exemplary algorithm for applying a compensation to image chrominance to compensate for color shift (if a color sensor is used) is described below:

Inputs: color measurement sensor tri-stimulus values for ambient light $X_A$, $Y_A$, $Z_A$; color measurement sensor tri-stimulus values for ambient plus projector light $X_B$, $Y_B$, $Z_B$; adjusted pixel intensity value $(Y_P)_C$; projector pixel chromaticity values x, y, z.

For each image pixel ($P_{IJ}$), determine, such as by computation, an adjusted pixel tri-stimulus values:

$(X_P)_C=(1/c)*[x/y*(Y_P)_C-X_A], (Z_P)_C=(1/d)*[z/y*(Y_P)_C-Z_A]$ where $c=[X_B-X_A]/95.047$, $d=[Z_B-Z_A]/108.883$ Compute the image RGB values from tri-stimulus values. For example, assuming an sRGB image, the matrix transformation can be used:

$$\begin{bmatrix} R' \\ G' \\ B' \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \times \begin{bmatrix} X_P \\ Y_P \\ Z_P \end{bmatrix},$$

$R = (R')^{0.4}$, $G = (G')^{0.4}$, $B = (B')^{0.4}$

A screen projection system and methods of compensating for ambient light and projected light intensity that is non-uniform across the area of the viewing screen or varies over time is disclosed. In an exemplary embodiment, the screen projection system includes a system controller, a projector that produces a projected image, a projection screen, one or more light sensors located in close proximity to the projection screen, and in some embodiments, a camera. Exemplary embodiments of methods of compensating for non-uniform ambient light and projected light intensity include statically or dynamically measuring the ambient light intensity, statically or dynamically measuring the ambient plus projector light intensity, calculating the projected light intensity, performing a linear interpolation of the ambient light intensity, performing a linear interpolation of the projected light intensity, and performing image processing to compensate for the non-uniform light.

Although the foregoing has been a description and illustration of specific embodiments, various modifications and changes thereto can be made by persons skilled in the art without departing from the scope and spirit of the claimed subject matter as defined by the following claims.

What is claimed is:

1. A method of compensating, comprising:
   measuring a characteristic of ambient light incident on a screen at a plurality of spaced locations within an active area of the screen;
   determining a gradient of the characteristic across the active area of the screen; and
   determining, for each pixel location of the screen, an adjustment to be applied to light to be projected on the screen using the gradient.

2. The method of claim 1, wherein said measuring a characteristic is performed statically during a calibration mode.

3. The method of claim 1, wherein said measuring a characteristic, said determining a gradient, and said determining an adjustment are performed dynamically during a projector operation.

4. The method of claim 1, wherein said measuring a characteristic comprises:
   measuring ambient light intensity values at said plurality of spaced locations within the active area of the screen.

5. The method of claim 1, wherein said plurality of spaced locations within the active area of the screen comprises at least four spaced locations on and within an outer perimeter of the screen.

6. The method of claim 1, wherein said measuring a characteristic comprises:
   measuring color component characteristics of said ambient light at said plurality of spaced locations within the active area of the screen.

7. The method of claim 1, wherein said measuring a characteristic comprises capturing a reflected image of said screen with a camera.

8. The method of claim 1, wherein said determining a gradient comprises:
   performing a linear interpolation of ambient light intensity over an entirety of the active area of the screen.

9. A method of compensating, comprising:
   measuring an intensity of ambient light incident on a screen at a plurality of spaced locations within an active area of the screen;
   measuring an intensity of projected light combined with the ambient light incident on the screen at the plurality of spaced locations within the active area of the screen;
   determining a gradient of the intensity of the ambient light across the active area of the screen;
   determining a gradient of the intensity of the projected light combined with the ambient light across the active area of the screen; and
   determining, for each pixel location of the screen, an adjustment to be applied to light to be projected on the screen using the intensity gradient of the ambient light and the intensity gradient of the projected light combined with the ambient light.

10. The method of claim 9, wherein said measuring an intensity of ambient light and said measuring an intensity of projected light combined with the ambient light are performed statically during a calibration mode.

11. The method of claim 9 wherein said measuring an intensity of ambient light and said measuring an intensity of projected light combined with the ambient light, said determining a gradient of the intensity of the ambient light and said determining a gradient of the intensity of the projected light combined with the ambient light, and said determining an adjustment are performed dynamically during a projector operation.

12. The method of claim 9, wherein said plurality of spaced locations within the active area of the screen comprises at least four spaced locations on and within an outer perimeter of the screen.

13. The method of claim 9, wherein said measuring an intensity of projected light combined with the ambient light comprises capturing a reflected image of said screen with a camera.

14. The method of claim 9 further comprising:
calculating differences between said measured intensity of ambient light and said measured intensity of projected light combined with the ambient light to determine a gradient of an intensity of projected light within the active area of the screen.

15. The method of claim 14, wherein said determining a gradient of an intensity of the projected light comprises:
performing a linear interpolation of projected light intensity over an entirety of the active area of the screen.

16. A computer-readable medium, comprising computer-executable instructions configured for:
measuring a characteristic of ambient light incident on a screen at a plurality of spaced locations within an active area of the screen;
determining a gradient of the characteristic across the active area of the screen; and
determining, for each pixel location of the screen, an adjustment to be applied to light to be projected on the screen using the gradient.

17. The medium of claim 16, wherein said measuring a characteristic is performed statically during a calibration mode.

18. The medium of claim 16, wherein said measuring a characteristic, said determining a gradient, and said determining an adjustment are performed dynamically during a projector operation.

19. The medium of claim 16, wherein said measuring a characteristic comprises:
measuring ambient light intensity values at said plurality of spaced locations within the active area of the screen.

20. The medium of claim 16, wherein said plurality of spaced locations within the active area of the screen comprises at least four spaced locations on and within an outer perimeter of the screen.

21. The medium of claim 16, wherein said measuring a characteristic comprises capturing a reflected image of said screen with a camera.

22. The medium of claim 16, wherein said determining a gradient comprises:
performing a linear interpolation of ambient light intensity over an entirety of the active area of the screen.

23. A projection system, comprising:
a screen;
a projector configured to project an image onto the screen;
a plurality of light sensors configured to measure ambient light and projected light within an active area of the screen;
a controller configured to determine an intensity gradient of ambient light across the active area of the screen and an intensity gradient of projected light across the active area of the screen using signals from said plurality of light sensors, and configured to determine and perform compensation adjustments for each pixel location of the screen and each pixel location of the projector using said intensity gradient of ambient light and said intensity gradient of projected light.

24. The system of claim 23, wherein said controller includes a configuration to determine adjustments to video input signals to perform said compensation adjustments and compensate for said intensity gradient of ambient light.

25. The system of claim 23, further comprising a lookup table, wherein said compensation adjustments are stored in said lookup table.

26. A projection system, comprising:
a system controller responsive to video input signals;
a projector that produces a projected image in response to video output signals from the controller;
a plurality of light sensors located in spaced locations within an active area of a projection screen;
wherein said system controller comprises:
means responsive to said plurality of light sensors to determine an ambient light intensity gradient across the active area of the projection screen;
means for calculating and applying a set of corrections for each pixel location of the projection screen and each pixel location of the projector to mitigate said ambient light intensity gradient.

27. The system of claim 26, wherein said system controller further comprises means for applying said set of corrections to said video input signals to provide said video output signals as modified video output signals.

28. The system of claim 26, wherein said projection screen is an active projection screen with having associated screen electronics, and said system controller further comprises means for applying said set of corrections to said screen electronics of said active projection screen to modulate a reflectivity of said active projection screen.

29. The system of claim 26, further comprising a lookup table, wherein said set of corrections are stored in said lookup table.

* * * * *

UNITED STATES PATENT AND TRADEMARK OFFICE
CERTIFICATE OF CORRECTION

PATENT NO. : 7,614,753 B2  Page 1 of 1
APPLICATION NO. : 11/263813
DATED : November 10, 2009
INVENTOR(S) : Masoud Zavarehi et al.

It is certified that error appears in the above-identified patent and that said Letters Patent is hereby corrected as shown below:

In column 10, line 63, in Claim 11, delete "claim 9" and insert -- claim 9, --, therefor.

In column 11, line 12, in Claim 14, delete "claim 9" and insert -- claim 9, --, therefor.

Signed and Sealed this

Tenth Day of August, 2010

David J. Kappos
*Director of the United States Patent and Trademark Office*